May 1, 1951 B. RITTER 2,550,721
INTERMEDIATE SUPPORT FOR ROTATABLE THREADED MEMBERS
Filed Aug. 9, 1948 2 Sheets-Sheet 1
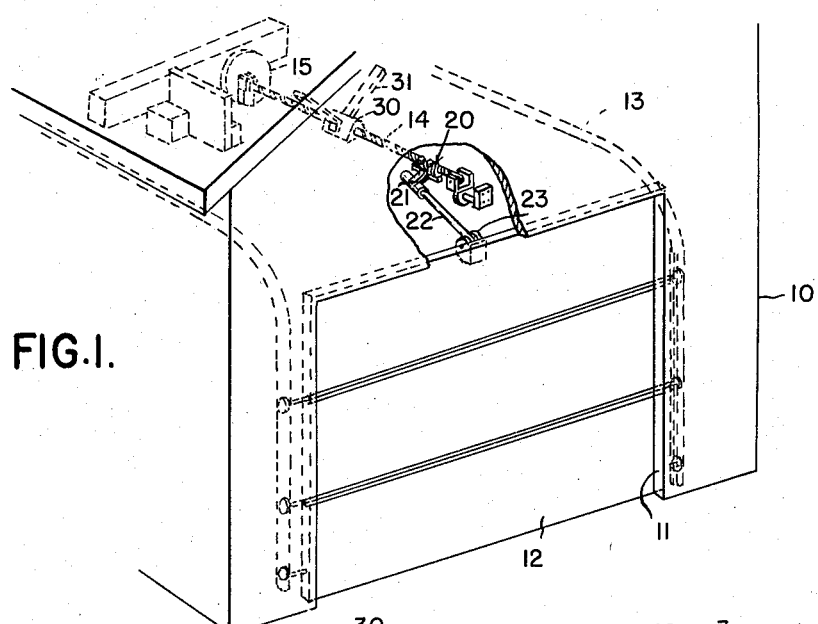
INVENTOR.
BERT RITTER
BY Whittemore, Hulbert
& Belknap ATTORNEYS May 1, 1951        B. RITTER        2,550,721
INTERMEDIATE SUPPORT FOR ROTATABLE THREADED MEMBERS Filed Aug. 9, 1948        2 Sheets-Sheet 2

*INVENTOR.*
BERT RITTER
BY
Whittemore, Hulbert
& Belknap   ATTORNEYS

Patented May 1, 1951

2,550,721

UNITED STATES PATENT OFFICE 2,550,721

INTERMEDIATE SUPPORT FOR ROTATABLE THREADED MEMBERS

Bert Ritter, Detroit, Mich., assignor, by mesne assignments, to McKee Door Company, Aurora, Ill., a corporation of Illinois Application August 9, 1948, Serial No. 43,333

10 Claims. (Cl. 74—424.8)

The present invention relates to an intermediate support for rotatable threaded members. An elongated threaded shaft with a cooperating threaded follower is useful in many applications, such for example, as effecting opening and closing movement of a garage door. However, a difficulty is encountered when the length of travel of the traveling member becomes excessive in that it has been difficult in the past to support the intermediate portion of the threaded member without interfering with passage therepast of the traveling device.

In accordance with the present invention, means are provided for supporting the elongated threaded member at an intermediate portion and this means is constructed to provide a gap at one side of the threaded member through which the traveling device may pass. The support includes spaced rollers engageable only with the tops of the thread and the traveling device includes a supporting strap or the like which is helically wound to engage the threaded member between convolutions of the thread. The arrangement is such that the helically wound strap lies beneath the tops of the thread and therefore will not interfere with the support. Preferably, the traveling device is provided with independent means for reacting with the thread, such for example, as one or more pairs of spaced rollers engageable with the sides of the thread and disposed to pass through the gap in the support.

With the foregoing general description in mind it is an object of the present invention to provide means for supporting the intermediate portion of an elongated threaded shaft without interfering with passage of a cooperating threaded traveling device.

Other objects and features of the invention will become apparent as the description proceeds, especially when taken in conjunction with the accompanying drawings, wherein:

Figure 1 is a fragmentary perspective view of a door operating device which incorporates the improved shaft supporting structure.

Figure 2 is a side elevation of a portion of the threaded shaft, the traveling device and the support partly in section.

Figure 3 is a section on the line 3—3 of Figure 2 in which the complete support is shown.

Figure 4:
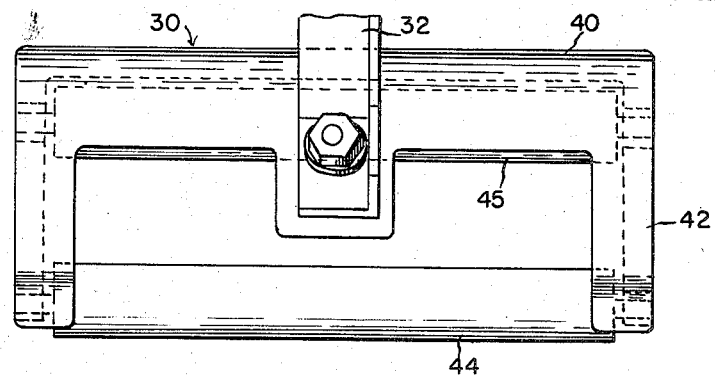
Figure 4 is a side elevation of the support taken by itself.

Referring now to Figure 1 there is illustrated a garage 10 having a door opening 11 adapted to be closed by an articulated door 12 which is mounted for upward and rearward sliding movement on tracks 13. To accomplish this movement an elongated threaded member 14 is provided which is supported at its ends for rotation and which includes means for rotating the member which are indicated diagrammatically at 15. Mounted on the threaded member 14 is a traveling device 20 which is internally threaded to be moved along the threaded member 14 when such member is rotated. Traveling device 20 includes a pivoted yoke 21 connected by a rod 22 to a bracket 23 on the top of the door 12. As will be readily apparent rotation of the threaded member 14 will cause the traveling device 20 to move from one end to the other thus opening or closing the door 12.

When this construction is provided on relatively large doors or when for other reasons it is desirable to provide for a very considerable length of travel of the traveling device, it becomes important to provide additional support for the threaded member. In the present case this is accomplished by a support indicated generally at 30 which is rigidly retained in supporting position by arms 31 which may be secured to suitable structure in the interior of the garage.

Referring now more particularly to Figures 2–6 the threaded member 14 is preferably in the form of a cylindrical shaft 35 on which a single thread is disposed by winding an elongated member 36 thereabout in helical formation. Adjacent convolutions of the thread 36 are spaced apart a substantial distance so as to leave relatively wide cylindrical portions therebetween.

The support 30 comprises a frame 40 including two downwardly extending arms 41 and 42 each of which terminates in inwardly extending ears 43 which provide supports for elongated rollers 44. At the upper end of the frame 41 is a similar roller 45. The roller 45 is mounted at its ends by bearings indicated at 46 upon eccentric studs 47 carried by rotatably adjustable plugs 48 which are retained in adjusted position in the frame by set screws 49. Accordingly, by rotating the plugs 48, the roller 45 may be vertically adjusted with respect to the bottom rollers 44.

The arrangement is such that the rollers 44 and 45 engage upon the top of the helical thread 36 and do not extend into the space between the threads.

A traveling device 20 comprises an elongated body 50 which extends generally parallel to the threaded member 14 and is provided with outwardly extending bosses 51 which are apertured to receive pins or the like for securing the yoke 21 thereto. Adjacent its ends are secured the ends of a strap 55, the ends of the straps being bolted or otherwise secured thereto as indicated at 56. The strap is provided with a helically formed intermediate portion adapted to engage the cylindrical portions of the shaft 35 intermediate the adjacent convolutions of the thread 36. The strap does not extend to the tops of the thread and accordingly does not engage the rollers 44 and 45. As best seen in Figure 3 the ends of the strap 55 are turned inwardly so as to pass between a gap indicated by the numeral 60 between the rollers 44.

Figure 6:
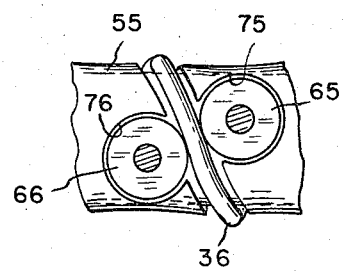
Figure 6 is a fragmentary section on the line 6—6 of Figure 2 showing the cooperation between the thread, the supporting strap and the rollers.

Preferably the intermediate portions of the strap 55 are transversely curved as best illustrated in Figure 2 so as to reduce the area of contact between the strap and the threaded member 14. In the present embodiment of the invention the strap 55 is not intended to engage the sides of the thread 36 and it will be noted in Figure 2 that clearance is illustrated between the side edges of the strap and the adjacent sides of the thread. In order to effect longitudinal movement of the traveling device 20 upon rotation of the threaded member, drive rollers 65 and 66 are provided on the upper surface of the body 50. As best seen in Figure 6 these drive rollers constitute a pair which engage opposite sides of a convolution of the thread 36 in such a way that the line of centers of the rollers extends perpendicular to the thread.

Figure 5:
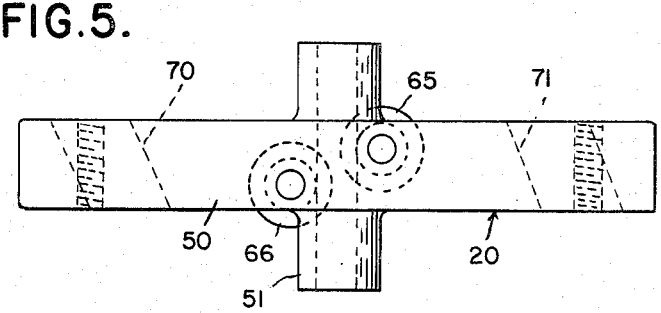
Figure 5 is a bottom plan view of the traveling device.

In order to prevent binding of the traveling device 20 as it moves along the threaded member 14, preferably upstanding blocks 70, 71 are provided at opposite ends of the body. As best seen in Figures 2 and 5 these blocks are angularly disposed so as to lie between adjacent convolutions of the thread 36. In addition they are concave at their upper surface so as to have surface engagement with the cylindrical surface of the threaded member 14 between adjacent convolutions of its thread.

In order to accommodate the rollers 65 and 66, the adjacent portions of the strap 55 are cut away as indicated at 75, 76 respectively.

From the foregoing description it will be observed that upon rotation of the threaded member 14 its intermediate portion is firmly supported by the engagement between the rollers 44 and 45 with the tops of the thread 36. Preferably the rollers 44 and 45 are spaced at 120 degree intervals. In the event of wear it is a simple matter to adjust the top roller 45 vertically by rotation of the eccentric plugs 48.

The traveling device is suspended from the threaded member 14 by the helical portion of the strap 55 and this is accomplished without interference with the support rollers in the manner previously described. Upon rotation of the threaded member 14 thrust is imparted to the body 50 of the traveling device through the medium of the roller 65 and the roller 66. Engagement between the blocks 70 and 71 with the cylindrical portion of the threaded member 14 prevents the body 20 from canting and thereby binding of the traveling device is effectively prevented, even though its load is applied in different directions at a point spaced substantially from the axis of the shaft 14.

The helically threaded shaft, the support therefor, and the traveling device adapted to move from one side to the other of the support as the shaft is rotated, is also disclosed in my co-pending application, Serial No. 785,071, filed November 10, 1947.

The drawings and the foregoing specification constitute a description of the improved intermediate support for rotatable threaded members in such full, clear, concise and exact terms as to enable any person skilled in the art to practice the invention, the scope of which is indicated by the appended claims.

Subject matter disclosed in this application is more broadly claimed in the co-pending application of Herman C. Frentzel, Serial No. 60,850, filed November 19, 1948, now Patent No. 2,545,879.

What I claim as my invention is:

1. In combination, an elongated helically threaded rotatable member, a support for said member comprising a frame partly surrounding said member and leaving a gap at one side of said member, means in said frame engaging the tops of the threads of said member, and a traveling device having a helical part engaging said member below the tops of the threads and a body at least a portion of which extends laterally of said member beyond said gap, said device being shaped to pass through the gap in the support.

2. In combination, an elongated helically threaded rotatable member, a support for said member comprising a frame partly surrounding said member and leaving a gap at one side of said member, rollers in said frame engaging the tops of the threads of said member, and a traveling device having a helical part engaging said member below the tops of the threads and a body at least a portion of which extends laterally of said member beyond said gap, said device being shaped to pass through the gap in the support.

3. In combination, an elongated helically threaded rotatable member, a support for said member comprising a frame partly surrounding said member and leaving a gap at one side of said member, rollers in said frame engaging the tops of the threads of said member, one of said rollers being adjustable radially of said member, and a traveling device having a helical part engaging said member below the tops of the threads and a body at least a portion of which extends laterally of said member beyond said gap, said device being shaped to pass through the gap in the support.

4. In combination, an elongated helically threaded rotatable member, the thread on said member being formed to leave a relatively wide cylindrical portion between adjacent convolutions, a support for said member comprising a frame partly surrounding said member and leaving a gap at one side of said member, means in said frame engaging the tops of the threads of said member, and a traveling device having a helical strap engaging said member below the tops of the threads and a body at least a portion of which extends laterally of said member beyond said gap, said device being shaped to pass through the gap in the support.

5. In combination, an elongated helically threaded rotatable member, the thread on said member being formed to leave a relatively wide cylindrical portion between adjacent convolutions, a support for said member comprising a frame partly surrounding said member and leaving a gap at one side of said member, means in said frame engaging the tops of the threads of said member, and a traveling device having a helical strap engaging said member below the tops of the threads and a body at least a portion of which extends laterally of said member beyond said gap, said device being shaped to pass through the gap in the support, and rollers on said body engageable with the sides of the thread on said member and positioned so as to pass through the gap in said support.

6. In combination, an elongated cylindrical rotatable member, a thread on said member shaped to leave a relatively wide cylindrical portion between adjacent convolutions of said thread, a support partly surrounding said member shaped to define a gap at one side of said member and having support elements engaging the tops of said thread, a traveling device comprising an elongated body extending parallel to said member and a strap carried by said device helically wound around said member and engaging the cylindrical portion between the convolutions of the thread, said device being shaped to pass through the gap in said support, and rollers on said body engaging the sides of said thread.

7. In combination, an elongated cylindrical rotatable member, a thread on said member shaped to leave a relatively wide cylindrical portion between adjacent convolutions of said thread, a support partly surrounding said member shaped to define a gap at one side of said member and having support elements engaging the tops of said thread, a traveling device comprising an elongated body extending parallel to said member and a strap carried by said device helically wound around said member and engaging the cylindrical portion between the convolutions of the thread, rollers on said body engaging the sides of said thread, said device being shaped to pass through the gap in said support, and guide portions at the ends of said body engageable with the cylindrical portion of said member beyond adjacent parts of said strap.

8. In combination, an elongated cylindrical member, a thread on said member shaped to leave a relatively wide cylindrical portion between adjacent convolutions of said thread, a support partly surrounding said member shaped to define a gap at one side of said member and having support elements engaging the tops of said thread, a traveling device comprising an elongated body extending parallel to said member and a strap carried by said device helically wound around said member and engaging the cylindrical portion between the convolutions of the thread, said device being shaped to pass through the gap in said support, said strap being transversely curved to reduce the area of contact with said member, rollers on said body engaging the sides of said thread.

9. For use with an elongated helically threaded rotatable member, a support for an intermediate portion of the member comprising a frame partly surrounding the member and leaving a gap at one side of the member, means in said frame engaging the tops of the threads of the member, and a traveling device movable longitudinally of the member upon rotation of the member and shaped to pass through the gap in said frame, said device comprising a helical part engaging the member below the tops of the threads and a body to which said helical part is secured, at least a portion of said body extending laterally of the member beyond said gap.

10. For use with a helically threaded shaft, a support engaging the shaft only at the tops of the threads thereof, and shaped to leave a gap at one side of the shaft, a traveling device movable along the shaft from one side to the other of said support, said device comprising a helical part located between and below the tops of the threads of the shaft, and a second part located laterally from the shaft, said device having a portion shaped to pass through the gap in said support as said device moves along the shaft.

BERT RITTER.

REFERENCES CITED

The following references are of record in the file of this patent:

UNITED STATES PATENTS

| Number | Name | Date |
| --- | --- | --- |
| 1,436,072 | Allis | Nov. 21, 1922 |
| 2,441,092 | Weathers | May 4, 1948 |